(12) United States Patent
Van Hoek et al.

(10) Patent No.: US 8,903,659 B2
(45) Date of Patent: Dec. 2, 2014

(54) METHOD FOR ANALYSIS SEISMIC DATA WITH ATTRIBUTE FUNCTIONS

(75) Inventors: Tomas Van Hoek, Lutong (MY); Stephane Gesbert, Rijswijk (NL)

(73) Assignee: Shell Oil Company, Houston, TX (US)

( * ) Notice: Subject to any disclaimer, the term of this patent is extended or adjusted under 35 U.S.C. 154(b) by 566 days.

(21) Appl. No.: 13/375,622

(22) PCT Filed: Jun. 8, 2010

(86) PCT No.: PCT/EP2010/057964
§ 371 (c)(1), (2), (4) Date: Mar. 5, 2012

(87) PCT Pub. No.: WO2010/142659
PCT Pub. Date: Dec. 16, 2010

(65) Prior Publication Data
US 2012/0150447 A1 Jun. 14, 2012

(30) Foreign Application Priority Data
Jun. 9, 2009 (EP) .................................... 09162308

(51) Int. Cl.
*G01V 1/40* (2006.01)
*G01V 1/30* (2006.01)
*B01D 53/34* (2006.01)

(52) U.S. Cl.
CPC .............. *G01V 1/301* (2013.01); *B01D 53/343* (2013.01)
USPC .......................................................... 702/13

(58) Field of Classification Search
CPC .. B01D 53/343; B01J 19/02; B01J 2219/0277
USPC ................... 702/13, 182–185, 188
See application file for complete search history.

(56) References Cited

U.S. PATENT DOCUMENTS 5,136,551 A * 8/1992 Armitage ......................... 367/38
5,537,320 A 7/1996 Simpson et al. ............... 364/421
(Continued)

FOREIGN PATENT DOCUMENTS

| WO | WO9837437 | 8/1998 | .............. G01V 1/28 |
| WO | WO0133254 | 5/2001 | .............. G01V 1/25 |
| WO | WO2007046107 | 4/2007 | .............. G06F 19/00 |

OTHER PUBLICATIONS

Lomask, J. et al.; "New tools for seismic stratigraphic interpretation: Stratal convergene and instantaneous isochron attribute cubes derived from volumetric flattening of experimental strata"; AAPG Bulletin; vol. 93-No. 4; pp. 453-459; Apr. 2009.

(Continued)

*Primary Examiner* — Edward Raymond

(57) ABSTRACT

A method for stratigraphic analysis of seismic data comprises:
 selecting a seismic data volume comprising a plurality of samples;
 selecting a number of horizons within the seismic data volume;
 selecting a scale of interest within the seismic data volume, which ranges from 500 m up to the size of the entire seismic data volume;
 applying an attribute function to at least one of the selected number of horizons at the selected scale of interest; and
 displaying a stratigraphic attribute, which represents a geologic feature, such as a seismic facies attribute, an unconformity attribute and/or a thinning attribute that highlights a rate of thickness change of a formation layer between adjacent horizons, as a result of applying the attribute function at the selected scale of interest.
These attributes facilitate understanding of moderate to large-scale seismic geometries (500 m to 50 Km) and basin development over geologic time.

15 Claims, 11 Drawing Sheets

(56) References Cited

U.S. PATENT DOCUMENTS

| | | | |
|---|---|---|---|
| 6,018,498 A | 1/2000 | Neff et al. | 367/72 |
| 6,771,800 B2 | 8/2004 | Keskes et al. | 382/109 |

OTHER PUBLICATIONS

Robertson, J.D. et al.; "Complex seismic trace analysis of thin beds"; Geophysics; vol. 49-No. 4; pp. 344-352; Apr. 1984.

Zeng, H.; "Seismic geomorphology-based facies classification"; The Leading Edge, pp. 644-646; Jul. 2004.

Chopra s., et al; "Applications of texture attribute analysis to 3D seismic data"; The Leading Edge; pp. 934-940; Aug. 2006.

Neves, F. et al.; "Multi-attribute seismic volume facies classification for predicting fractures in carbonate reservoirs"; The Leading Edge; pp. 698-700; Jun. 2006.

* cited by examiner

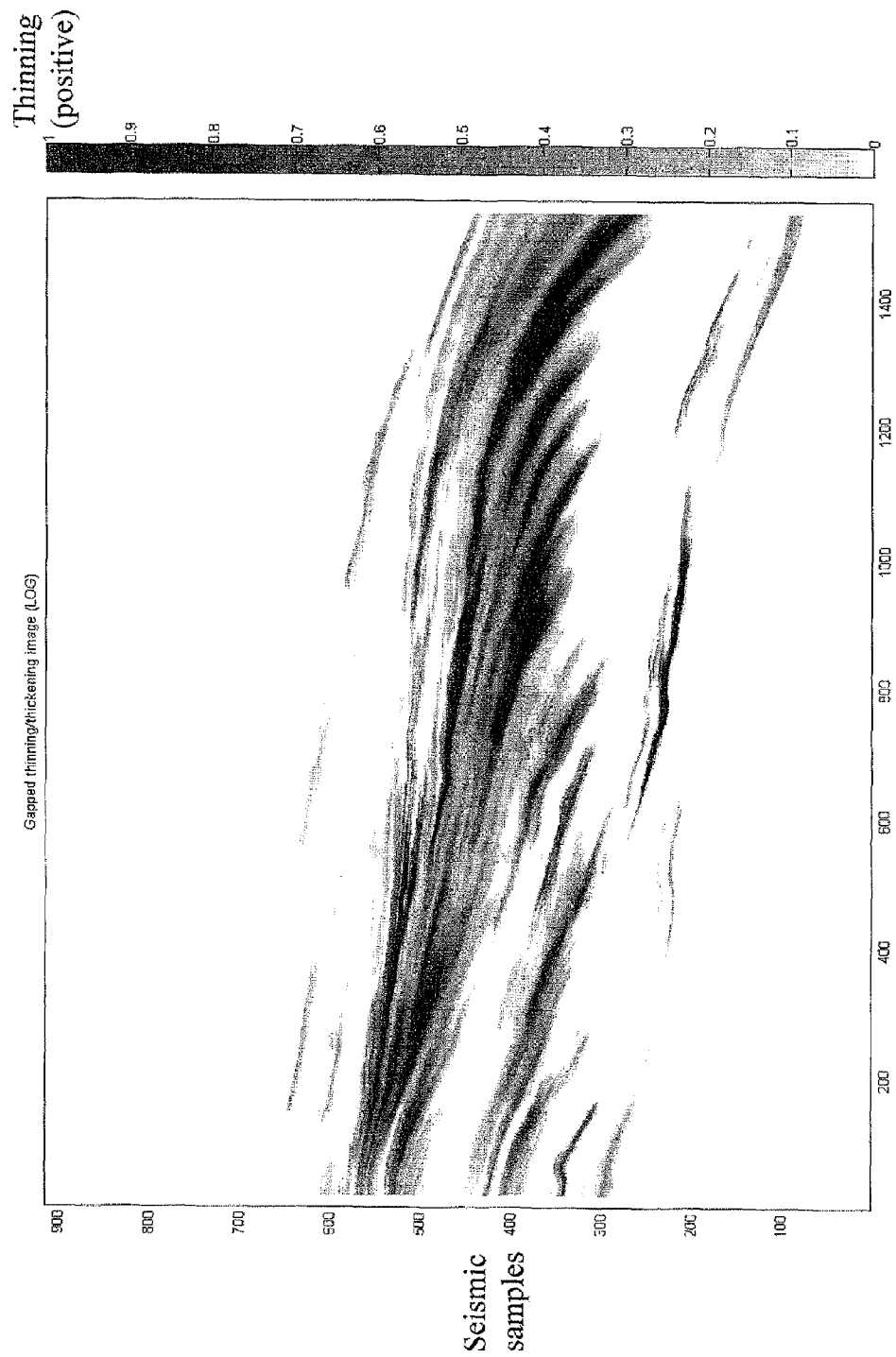
Figure 6. Thinning attribute (thinning updip / to the left)

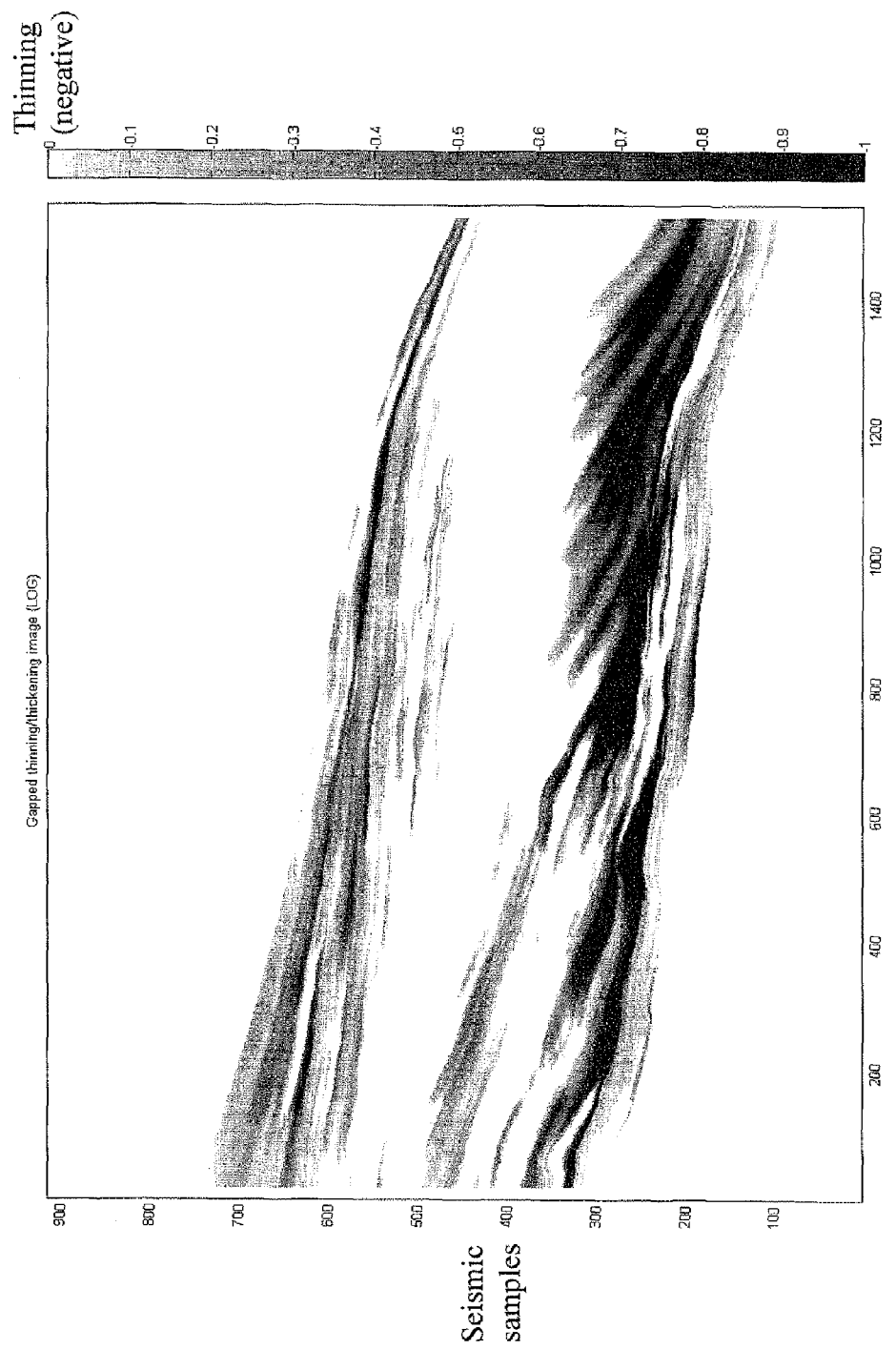
Figure 7. Thinning attribute (thinning downdip / to the right)

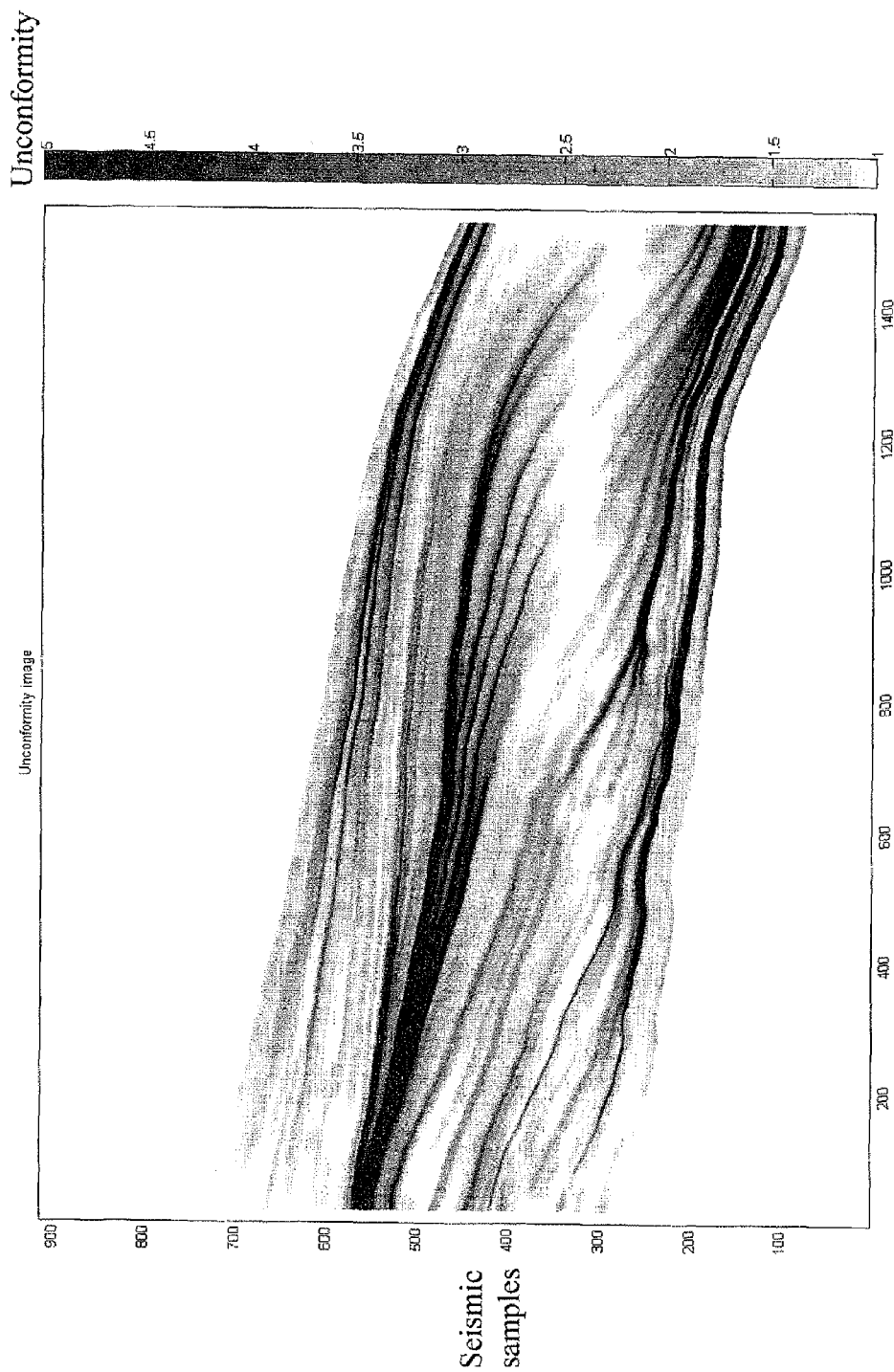
Figure 9 Unconformity attribute

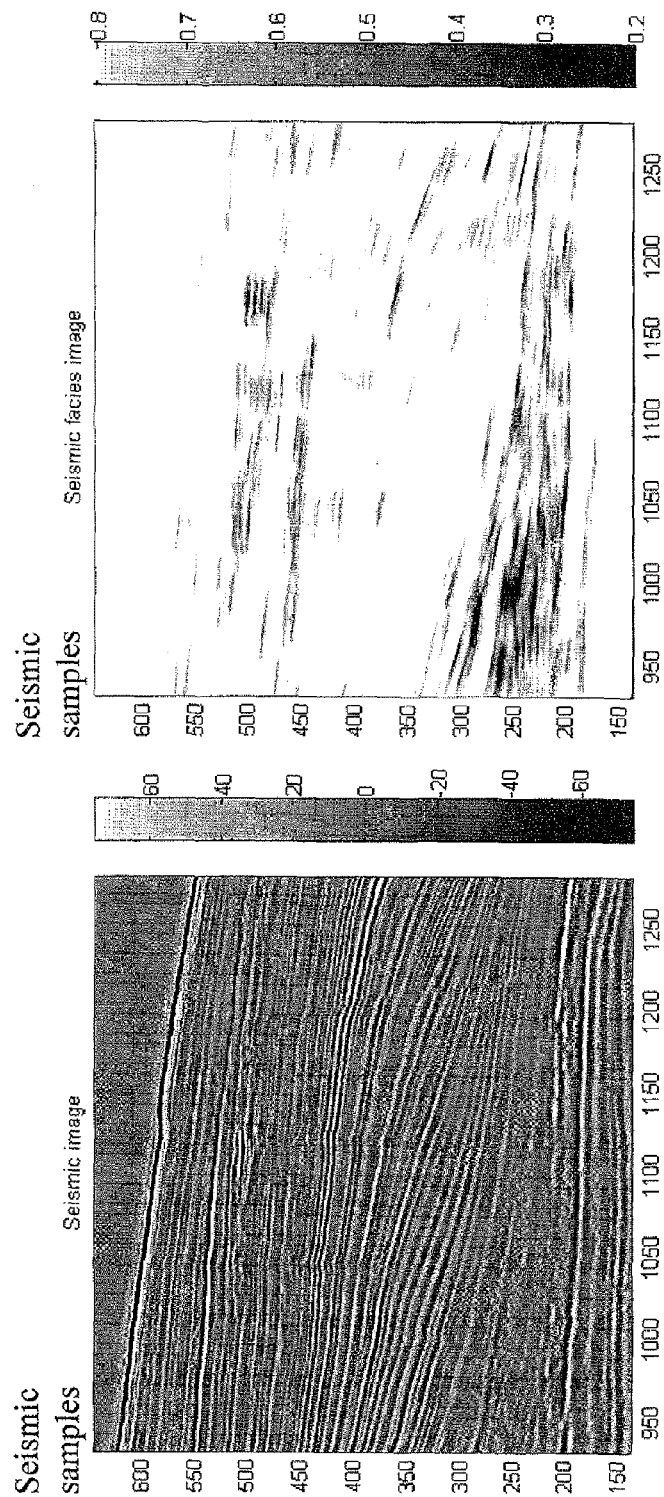
Figure 9B: seismic-facies attribute
Figure 9A: Seismic section

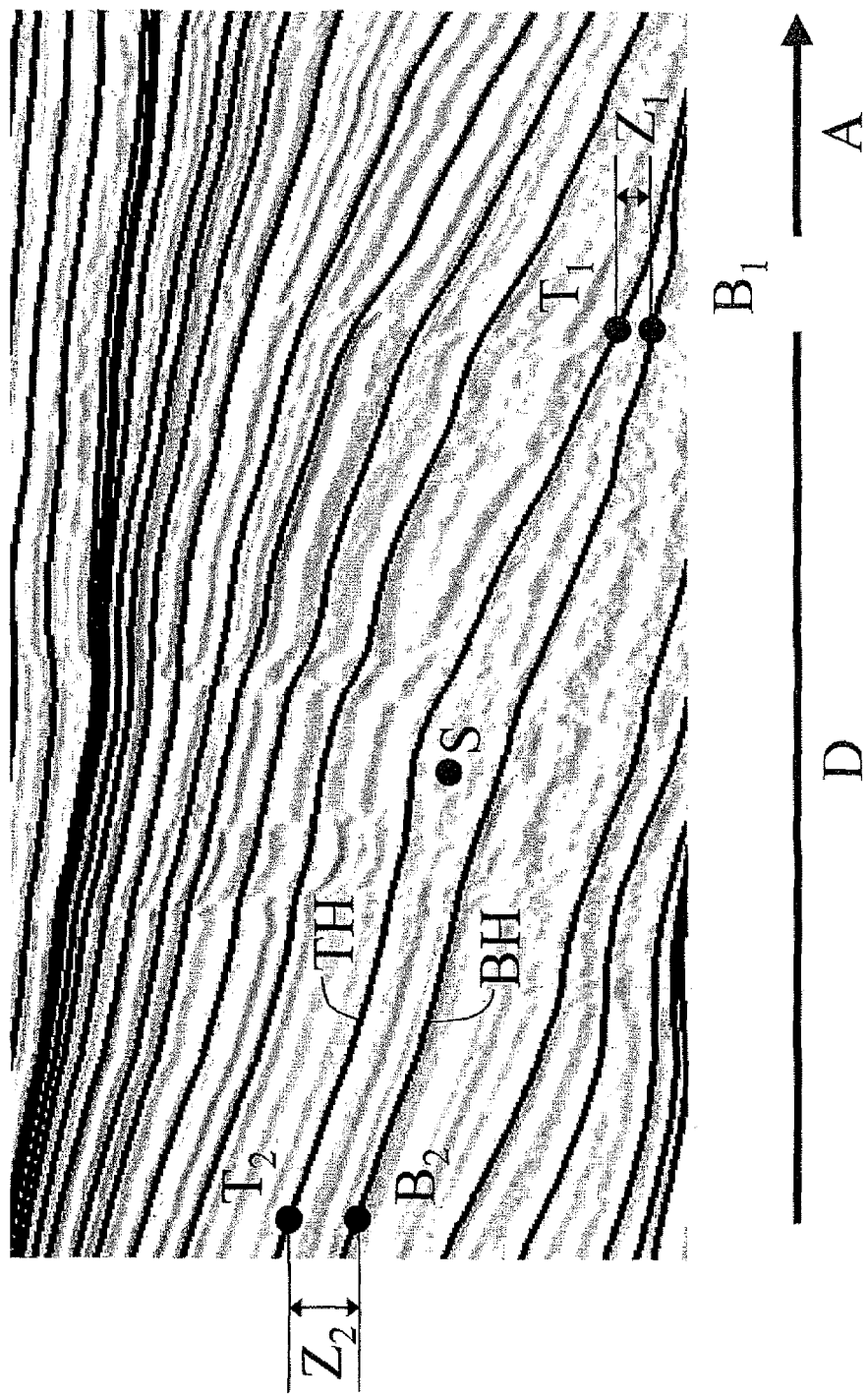
Fig.10: Thinning Attribute Generation

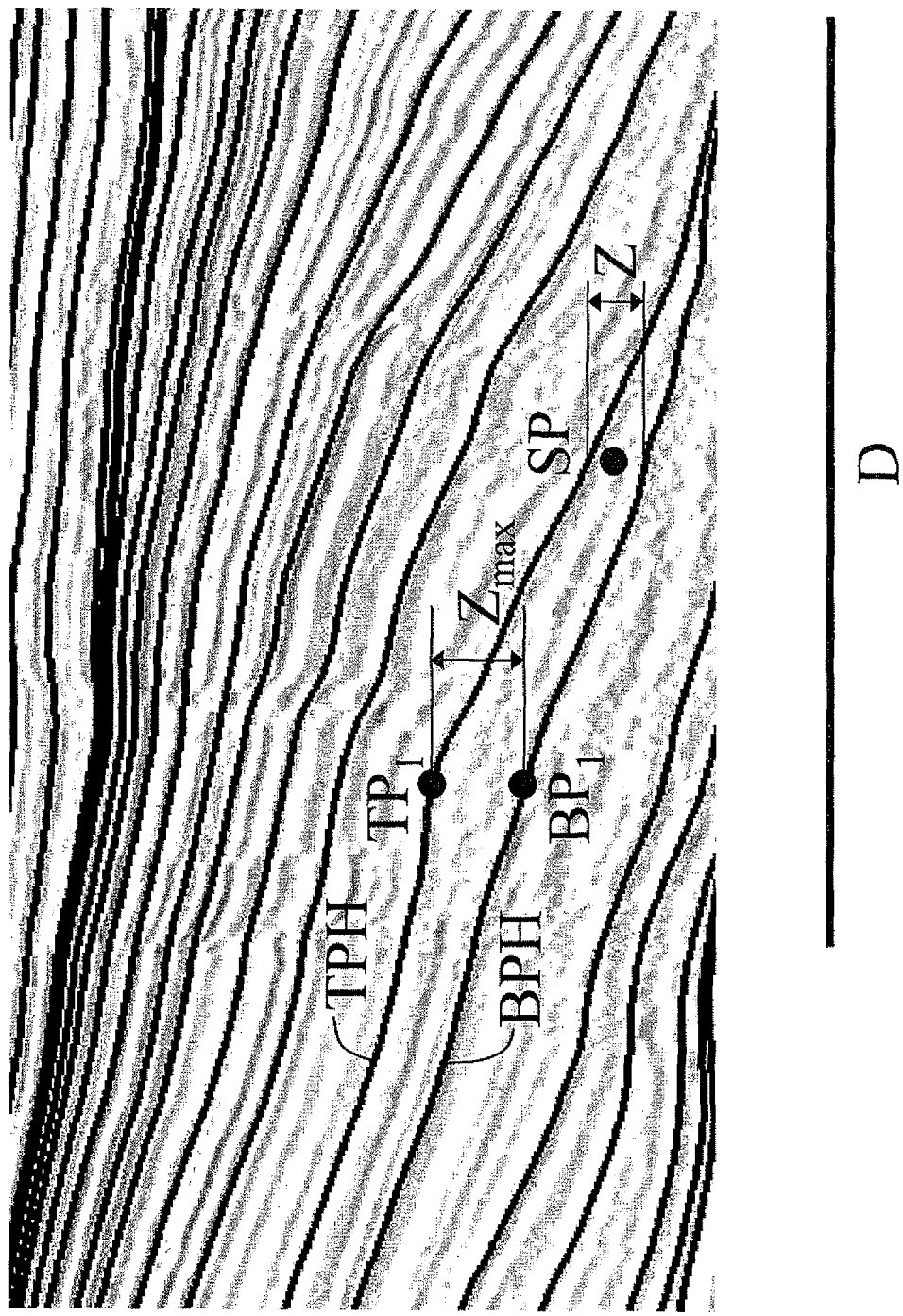
Fig.11: Unconformity Attribute Generation

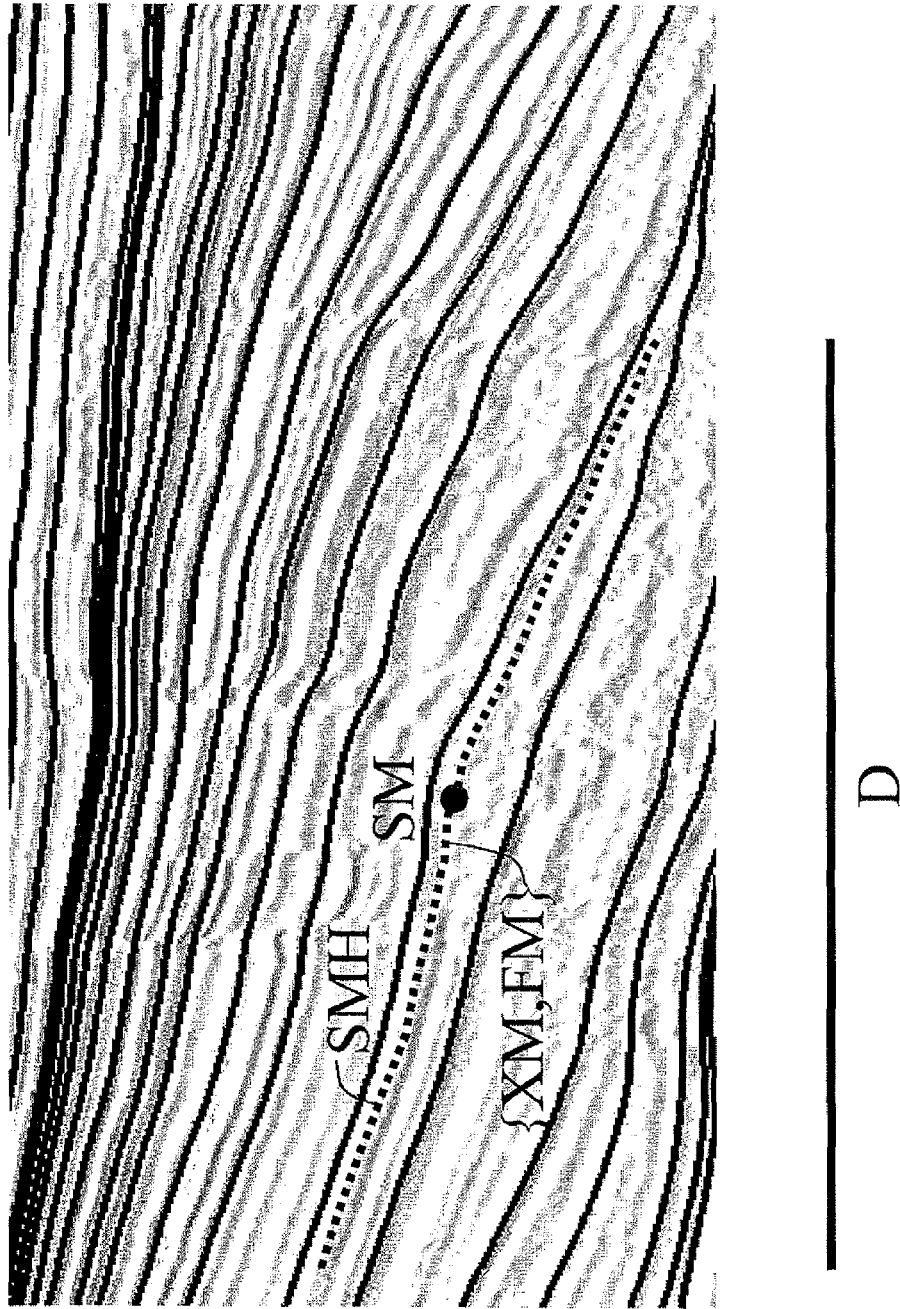
Fig.12: Seismic Facies Attribute Generation

METHOD FOR ANALYSIS SEISMIC DATA WITH ATTRIBUTE FUNCTIONS

CROSS REFERENCE TO EARLIER APPLICATIONS

The present application is a national stage application of International application No. PCT/EP2010/057964, filed 8 Jun. 2010, which claims priority from European Application 09162308.2, filed 9 Jun. 2009, which is incorporated herein by reference.

FIELD OF THE INVENTION

Background of the Invention

The invention relates to a method for stratigraphic analysis of seismic data.

In sequence stratigraphy, seismic facies analysis, and other seismic stratigraphic analysis techniques, the recognition and analysis of moderate- to large-scale seismic geometries (from a few hundred meters up to tens of kilometers) plays a crucial role. The standard suite of seismic attributes however, cannot capture geometries at such scales.

The article "New tools for seismic stratigraphic interpretation: Stratal convergence and instantaneous isochron attribute cubes derived from volumetric flattening of experimental strata" published by J. Lomask et al in the AAPG Bulletin; April 2009; v. 93; no. 4; p. 453-459), discloses a "stratal convergence attribute" that highlights "unconformities and stratal terminations", obtained from "an automatic full-volume-flattening algorithm" and is applied to a synthetic seismic volume in the article. The article does not disclose the detailed steps of the known method, but invokes the author J. Lomask's earlier "volume flattening" work at Stanford University, which aims at automatically flattening seismic data into "volumes of horizon slices" (J. Lomask and A. Guitton, 2007: Volumetric flattening: an interpretation tool, The Leading Edge 26, 888).

International patent application WO01/33254 (D1) discloses a seismic interpretation method wherein tangent planes are selected about any point of interest, which planes are very local approximations to subsurface layer boundaries, as indicated on page 5, line 18 of D1. More accurately, in any point of the subsurface D1 estimates a platelet in a neighbourhood of 3 by 3 (9) seismic traces. With a typical spatial sampling of 25 m from one seismic trace to the next, the plane or platelet is defined over an area of 50 by 50 square meters. In D1, the "isochron change per distance" attribute measures the direction and magnitude of maximal thickening between two "upper" and "lower" planes or platelets, about any point of a "3D output data cube". The scale of the attribute is therefore, by construction, the distance spanned by 3 consecutive seismic traces, no more, no less, as illustrated in FIGS. 1 and 2 of D1, so that this distance will be less than about 100 m. It is observed that a seismic horizon ideally follows a surface of geologically contemporaneous points in the earth, also known as an "isochronous" surface or an "isochron", meaning "of equal geologic time". Using seismic data, those skilled in the art, often with the help of dedicated computer software, can generate seismic horizons that approximate isochrons, which follow seismic reflections corresponding to variations of elastic properties. It is furthermore observed that if two adjacent subsurface layers have contrasting elastic properties, the seismic reflection and the isochron may coincide, but that need not always be the case.

U.S. Pat. No. 6,771,800 (D2) discloses a seismic interpretation method, which mentions "a display of all continuity curves" (FIG. 2*b* and page 13, lines 12-13 of D2) as represented by a matrix M. The matrix M, at any pixel or voxel of the subsurface, counts the number of seismic horizons that cross the pixel or voxel. In other words, the matrix M in D2 is an implied attribute that measures the density of seismic horizons at any point of the subsurface. The matrix M is as an intermediary step to ultimately segment a seismic section or volume, as indicated on page 1, lines 1-6 of D2.

It will be apparent to those skilled in the art that the attribute implied by matrix M in D2, bears some similarity with the unconformity attribute of the present invention. However, while D2 estimates the local density of horizons at a location of interest, the unconformity attribute in the present invention evaluates the ratio between the thickest part of the enclosing layer to its thickness at the location of interest. As a result the present invention can produce the unconformity attribute to any desired level of accuracy, and at the maximum possible vertical resolution.

The present invention furthermore aims to provide an improved method for analyzing seismic data, which relies on measurements performed on explicit seismic horizons.

It is a further object of the present invention to provide an entirely novel class of large-scale attributes for analyzing seismic data, of which the thinning attribute, the unconformity attribute, and seismic facies attributes are only a few instances. This novel class of attributes aims to assist a seismic interpreter in the process of recognizing, analyzing, and capturing moderate to large-scale seismic geometries (typically 500 meters to 50 kilometers) and results in a better understanding of the basin development over geologic time and therefore the spatial distribution of reservoir-, seal- and source rocks.

SUMMARY OF THE INVENTION

In accordance with the invention there is provided a method for stratigraphic analysis of seismic data, comprising:
(a) selecting a seismic data volume comprising a plurality of samples;
(b) selecting a number of horizons within the seismic data volume;
(c) selecting a scale of interest within the seismic data volume, which ranges from at least 500 meters up to the size of the entire seismic data volume;
(d) applying an attribute function to at least one of the selected number of horizons at the selected scale of interest; and
(e) displaying a stratigraphic attribute which represents a geologic feature as a result of applying the attribute function at the selected scale of interest. Optionally:
the seismic data volume spans at least a substantial part of a hydrocarbon containing formation and the method is used for managing exploration and/or production of hydrocarbons from the formation;
the selected scale is a substantial horizontal scale which ranges from at least 500 m up to the horizontal size of the entire seismic data volume;
the stratigraphic attribute, which represents a geologic feature, is displayed with a contrasting color and is a seismic facies attribute, or a thinning or unconformity attribute that highlights a rate of thickness change of a formation layer located between a pair of selected adjacent horizons.

A thinning attribute highlights variations of thickness of formation layers located between a pair of adjacent horizons and the step of applying the attribute function to generate the thinning attribute may comprise:
 (a) selecting a point of interest (S) within the seismic data volume;
 (b) selecting a first horizon (TH) and a second horizon (BH), respectively above and below the point of interest (S);
 (c) selecting a direction (A);
 (d) determine a first pair of end points $(T_1, B_1)$ situated on the first and second horizons (TH, BH) at a distance (0.5D) of half the user-defined scale (D), in the set direction (A); then determine a second pair of end points $(T_2, B_2)$ situated on the first and second horizons (TH, BH) at a distance (0.5D) of half the user-defined scale, in a direction opposite to the set direction (A);
 (e) deriving a first thickness property $(Z_1)$ at the first pair of end points $(T_1, B_1)$;
 (f) deriving a second thickness property $(Z_2)$ at the second pair of end points $(T_2, B_2)$;
 (g) calculating a rate $(Z_1/Z_2)$ between the first thickness property $(Z_1)$ and the second thickness property $(Z_2)$;
 (h) assigning the rate $(Z_1/Z_2)$ to be the thinning attribute at the point of interest (S);
 (i) repeating steps (a)-(h) for a plurality of points of interest (S) within the seismic data volume.

Optionally the quotient is a logarithmic quotient $\log(Z_1)-\log(Z_2)$ and if the logarithmic quotient $(\log(Z_1)-\log(Z_2))$ is positive the seismic samples comprised in the interval between the first and second horizons (TH, BH) above and below the point of interest (S) are displayed with a first distinctive colour, whereas if the logarithmic quotient $(\log(Z_2)-\log(Z_2))$ is negative the seismic samples comprised in the interval between the first and second horizons (TH, BH) above and below the point of interest (S) are displayed with another distinctive colour.

Alternatively, the stratigraphic attribute may be an unconformity attribute and the step of applying the attribute function comprises:
 (a) selecting a point of interest (SP) within the seismic data volume;
 (b) selecting a first horizon (TPH) and a second horizon (BPH), respectively above and below the point of interest (SP);
 (c) within a radius (0.5D) of half the user-defined scale (D) from the point of interest (S), determine a pair of points $(TP_1, BP_1)$ situated on the first and second horizons (TPH, BPH), which exhibit the maximum thickness property $(Z_{max})$
 (d) deriving a seed thickness property (Z) between the first and second horizons (TPH, BPH) at the point of interest (S);
 (e) calculating a rate $(Z_{max}/Z)$ between the seed thickness property (Z) and the maximum thickness property $(Z_{max})$;
 (f) assigning the rate $(Z_{max}/Z)$ to be a unconformity attribute at the location of the point of interest;
 (g) repeating steps (a)-(f) for a plurality of points of interest (SP) within the seismic data volume.

If the unconformity attribute, i.e. the rate $(Z_{max}/Z)$, is relatively small and close to 1 the seismic samples comprised in the interval between the first and second horizons (TPH, BPH) above and below the point of interest (S) are displayed with a neutral colour, whereas if the rate $(Z_{max}/Z)$ is relatively large the seismic samples comprised in the interval between the first and second horizons (TPH, BPH) above and below the point of interest (S) are displayed with a distinctive colour indicative of the presence of an unconformity.

It will be understood that if the unconformity attribute is determined in accordance with step d of claim 1 of the method according to the present invention, which indicates that an attribute function is applied to at least one of the selected number of horizons at the selected scale of interest, no estimation is made of the local density of horizons at a location of interest as is done with the method according to D2 (U.S. Pat. No. 6,771,800).

In other words step d of the method according to the invention applies the attribute function in a lateral direction along at least a substantial part of the length of one or more horizons, whereas D2 measures in a vertical direction a local density of horizons and then reconstructs and displays historic densities of these horizons.

In contrast to D2 the unconformity attribute in the method according to the present invention does not reconstruct or display any historic densities of horizons but is used to display a clearly visible ratio between the thickest part of a formation layer between a pair of adjacent horizons to its thickness at the location of interest. This ratio allows to display the unconformity attribute at any desired level of accuracy and at a maximum possible vertical resolution, which is not possible with the method known from D2.

Alternatively, the attribute may be a seismic facies attribute and the step of applying the attribute function comprises:
 (a) selecting a seismic-facies attribute data volume comprising a plurality of samples;
 (b) selecting a point of interest (SM) within the seismic data volume;
 (c) selecting point (SM) to be a seed point;
 (d) selecting or generating a horizon (SMH) containing the seed point (SM);
 (e) Extracting all points (XM) situated on the selected or generated horizon (SMH) within a distance (0.5D) of half the user-defined scale (D);
 (f) estimating or extracting the set of seismic-facies attribute values (FM) associated to points (XM);
 (g) calculating the statistical mean or average of the set of seismic-facies attribute values (FM)
 (h) assigning the statistical mean to be the final seismic-facies attribute at the point of interest (SM); and
 (i) repeating steps (a)-(h) for a plurality of points of interest (SM) within the seismic data volume.

A "seismic facies" attribute provides a local measure of the parallel nature of seismic reflections on a moderate scale. It typically maps data across a scale from "parallel/continuous" to "chaotic" seismic reflections, and displays the result in distinctive colours depending on its value. This translates into patterns suggestive of local perturbations in continuous reflector geometry. Raw seismic-facies attributes are often difficult to interpret because of the local nature of the measurements, and averaging the measurements in their stratigraphic context, that is: along seismic horizons as advocated above, improves the interpretability of the final seismic-facies attribute.

These and other features, embodiments and advantages of the method according to the invention are described in the accompanying claims, abstract and the following detailed description of preferred embodiments disclosed in the accompanying drawings in which reference numerals are used which refer to corresponding reference numerals that are shown in the drawings.

BRIEF DESCRIPTION OF THE DRAWINGS

FIGS. 6 and 7 shows a thinning attribute generated in the seismic volume of FIG. 5 accordance with the method according to the invention, wherein black in FIG. 6 indicates thinning to the left, and black in FIG. 7 indicates thinning to the right;

FIG. 8 shows an unconformity attribute in the seismic volume of FIG. 5, wherein white means conformable, whereas black means unconformable;

FIG. 9A shows a seismic section in the seismic volume of FIG. 5;

FIG. 9B shows a seismic-facies attribute according to the invention in the seismic section of FIG. 9A highlighting chaotic regions (black) and parallel/continuous regions (white) within the seismic data;

FIG. 10 shows how a thinning attribute is generated in accordance with the method according to the invention in a section of the seismic volume of FIG. 5;

FIG. 11 shows how an unconformity attribute is generated in accordance with the method according to the invention in a section of the seismic volume of FIG. 5; and FIG. 12 shows how a seismic facies attribute is generated in accordance with the method according to the invention in a section of the seismic volume of FIG. 5.

DETAILED DESCRIPTION OF THE DEPICTED EMBODIMENTS

Seismic stratigraphy, the study of stratigraphy and depositional facies as interpreted from seismic data, is critical to the understanding of basin evolution and predicting the spatial distribution of reservoir, seal and source rocks. The most widely used seismic stratigraphic interpretation technique within the industry is referred to as "sequence stratigraphy".

Classic sequence stratigraphy is based on the subdivision of seismic data into relative chronologic packages, referred to as seismic sequences and seismic systems tracts. Regional flooding events, sequence boundaries and parasequence boundaries can be identified based on the geometry of seismic reflection terminations (onlap, downlap, truncation, toplap & apparent truncation). Seismic facies within these systems tracks can be delineated in terms of reflector configuration, continuity, amplitude, frequency, and interval velocity. These, in turn, can be interpreted in terms of environment of deposition and used as predictors of lithology.

Understanding this interplay of scales, from the fundamental first-order hierarchy of sequences to higher frequency events, plays a vital role in hydrocarbon exploration and exploitation. The recognition of these features in seismic data has become a mature science, but it can still be challenging, especially in poor quality data or for the generalist interpreter. To help enhance and amplify stratigraphy in seismic data, affiliates of the applicant have developed tools to recognize and analyze moderate to large-scale seismic geometries (few hundred meters up to tens of kilometers) as well as seismic facies.

This proprietary stratigraphic sequencing workflow, allows interpreters to interactively detect, analyze, and capture moderate to large-scale seismic geometries as well as seismic facies. This functionality reveals or adds clarity to geologic features that are not immediately apparent or subtle on standard seismic data.

In the description of the invention or in the claims, the concept of scale is used to designate a spatial length or distance. The scale may be expressed in two manners, either in units of distance (meters or kilometers) or equivalently as spanning a number of seismic traces, whereby a trace refers to a vertical collection of samples of a seismic data volume or line. The distance between two adjacent seismic traces, for instance 25 meters, then represents the unit of scale.

The method according to the invention is also identified as GeoLeaf.

Figure 1:
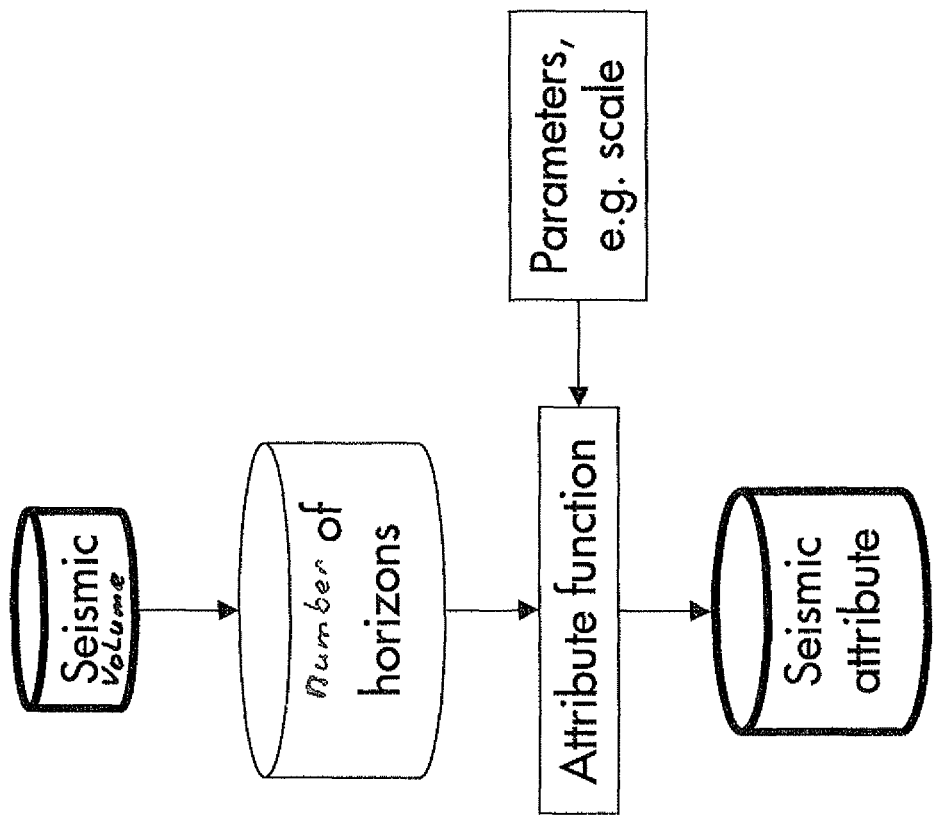
FIG. 1 is a high-level flowscheme of the GeoLeaf workflow in accordance with the invention.
Figure 3:
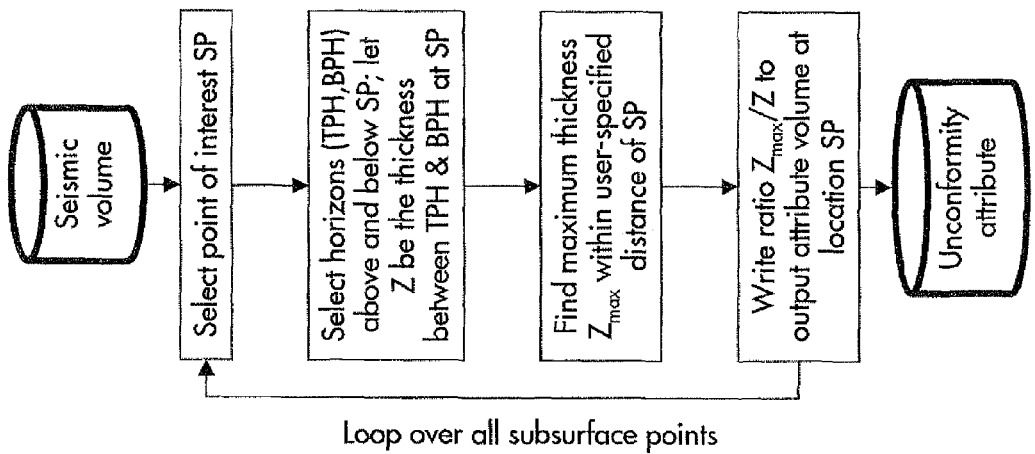
FIGS. 2, 3 and 4 are specializations of the high-level flowscheme to various embodiments of the GeoLeaf attributes in accordance with the invention.
Figure 2:
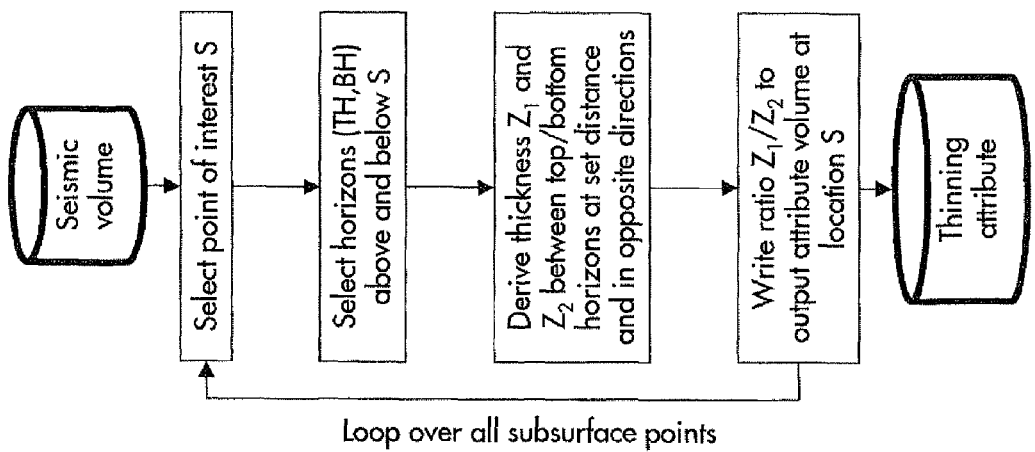
Figure 4:
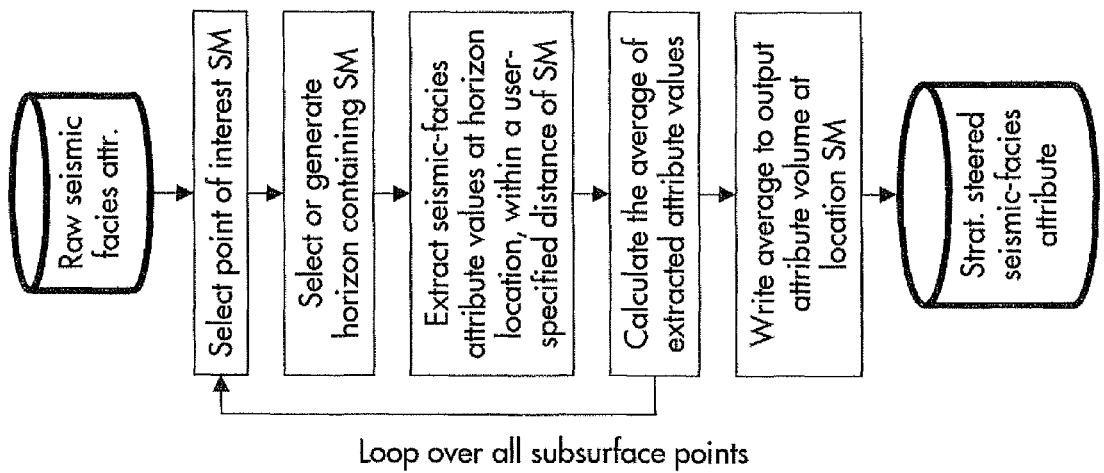

FIG. 1 shows a high level Geoleaf workflow according to the invention wherein the first step is the generation of a geometric framework. The framework consists of a dense stack of a number of horizons following the structure of the seismic data. Once this framework has been generated, the following three geometric seismic attributes can be calculated at user specified scales:

1) The "thinning" attribute shown in FIG. 2 highlights seismic thinning, parallelism, and thickening over a large scale (typically >100 traces). As this highlights seismic packages with similar geometrical behaviour (genetic reflection packages), the attribute helps the interpreter to distinguish seismic sequences and systems tracts.
2) The "unconformity" attribute shown in FIG. 3 measures strong vertical gradients of relative geological time (assuming that geological time lines follow seismic reflections) over a large scale (typically >1000 traces). The unconformity attribute highlights discordant stratal relationships within the seismic section (e.g. angular unconformities), but also concordant relationships that relate to condensed sections. This attribute can help the interpreter to identify both sequence boundaries as well as the boundaries between systems tracts.
3) The "seismic facies" attribute shown in FIG. 4 provides a measure of the parallel nature of seismic reflections on a moderate scale (typically >20 traces). It maps data across a scale with two end members, typically: "parallel/continuous", and "chaotic" seismic reflections. This translates into patterns suggestive of local perturbations in continuous reflector geometry (e.g. channels).

The Marlim/Barracuda fields of the Campos Basin (Brazil) serves as an excellent test case for the Geoleaf sequence stratigraphic approach. The area is covered by extensive toe-of-slope turbidite systems and strongly overprinted with a component of salt tectonics.

Figure 5:
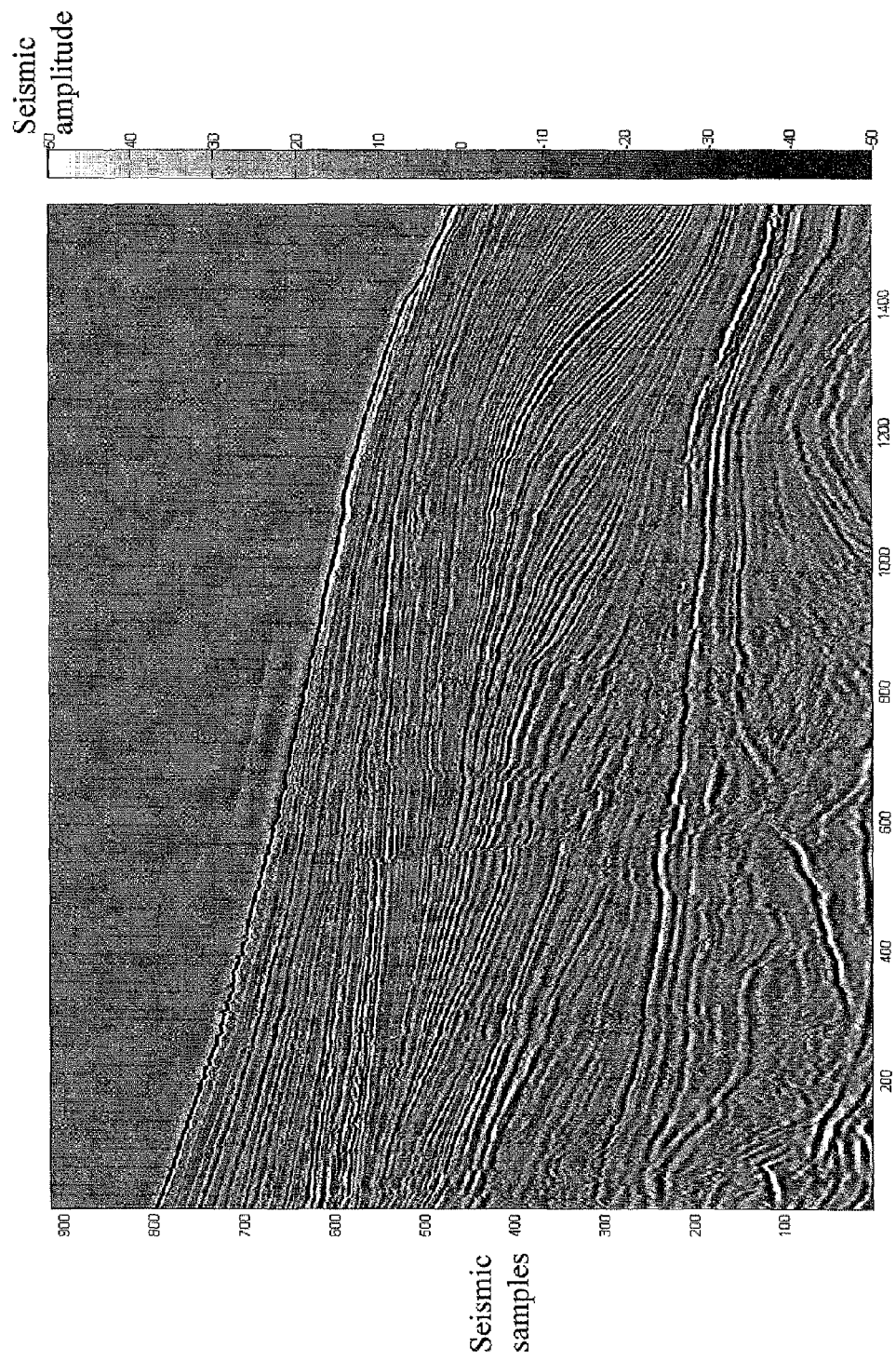
FIG. 5 shows a seismic volume comprising a seismic depositional dip line through Campos basin Brazil.

FIG. 5 shows a seismic dip section of the Barracuda Field of the Campos Basin. FIG. 6 shows the seismic section of FIG. 5, wherein a thinning attribute
 the color scale highlighting thinning towards the left
 subdivides the deltaic clinoforms into parasequences and accentuates their progradational nature. The same thinning attribute in FIG. 7—the color scale now highlighting thinning towards the right—accentuates the downlapping geometry of the foresets. Scale of image is 40 km wide, 3.75 seconds high.

FIG. 6 shows in more detail, the seismic section of FIG. 5, wherein the main toe slope turbidite sand accumulation is highlighted as a (black) wedge thinning towards the left onto a clinoform.

FIG. 8 shows how in the seismic section of FIG. 5 the unconformity attribute can highlight the major breaks in the stratigraphy, wherein black means conformable seismic geometries and white means unconformable seismic geometries. In the Barracuda case, it also highlights the condensed nature of the clinoform fore-sets, which are a critical factor in assessing top seal risk in this environment of deposition. FIG. 8 is shown at the same scale as FIG. 5.

FIGS. 9A and 9B show a seismic-facies attribute highlighting chaotic regions in black color, semi-parallel regions and parallel regions in white color within the seismic data.

Notice that some regions that seem parallel to the eye are in fact not completely parallel.

Image scale of FIGS. 9A and 9B is 7500 m wide, 1800 msec high.

FIG. 10 shows how the thinning attribute is generated on the basis of the following steps:
(a) selecting a point of interest (S) within the seismic data volume;
(b) selecting a first horizon (TH) and a second horizon (BH), respectively above and below the point of interest (S);
(c) selecting a direction (A);
(d) determining a first pair of end points ($T_1, B_1$) situated on the first and second horizons (TH, BH) at a distance (0.5D) of half the user-defined scale (D), in the set direction (A); then determining second pair of end points ($T_2, B_2$) situated on the first and second horizons (TH, BH) at a distance (0.5D) of half the user-defined scale, in a direction opposite to the set direction (A);
(e) deriving a first thickness property ($Z_1$) at the first pair of end points ($T_1, B_1$);
(f) deriving a second thickness property ($Z_2$) at the second pair of end points ($T_2, B_2$);
(g) calculating a rate ($Z_1/Z_2$) between the first thickness property ($Z_1$) and the second thickness property ($Z_2$);
(h) assigning the rate ($Z_1/Z_2$) to be the thinning attribute at the point of interest (S);
(i) repeating steps (a)-(h) for a plurality of points of interest (S) within the seismic data volume.

FIG. 11 shows how the unconformity attribute is generated on the basis of the following steps:
(a) selecting a point of interest (SP) within the seismic data volume;
(b) selecting a first horizon (TPH) and a second horizon (BPH), respectively, above and below the point of interest (SP);
(c) within a radius (0.5D) of half the user-defined scale from the point of interest (S), determine points ($TP_1, BP_1$) situated on the first and second horizons (TPH, BPH), which exhibit the maximum thickness property ($Z_{max}$);
(d) deriving a seed thickness property (Z) between the first and second horizons (TPH, BPH) at the point of interest (S);
(e) calculating a rate ($Z_{max}/Z$) between the seed thickness property (Z) and the maximum thickness property ($Z_{max}$);
(f) assigning the rate ($Z_{max}/Z$) to be a unconformity attribute at the location of the point of interest(S);
(g) repeating steps (a)-(f) for a plurality of points of interest (SP) within the seismic data volume. FIG. 12 shows how the seismic-facies attribute is generated on the basis of the following steps:
(a) selecting a seismic-facies attribute data volume comprising a plurality of samples;
(b) selecting a point of interest (SM) within the seismic data volume;
(c) selecting point (SM) to be a seed point; (d) selecting or generating a horizon (SMH) containing the seed point (SM);
(e) extracting all points (XM) situated on horizon (SMH) within a distance (0.5D) of half the user-defined scale (D);
(f) estimating or extracting the set of seismic-facies attribute values (FM) associated to points (XM);
(g) calculating the statistical mean or average of the set of seismic-facies attribute values (FP);

(h) assigning the statistical mean to be the final seismic-facies attribute at the point of interest (SM); and
(i) repeating steps (a)-(h) for a plurality of points of interest (SM) within the seismic data volume.

It will be understood from the foregoing that the Geoleaf seismic interpretation method according to the invention will help a seismic interpreter with the process of recognizing, analysing, and capturing moderate to large-scale seismic geometries (20-1000 traces). This process results in a better understanding of the basin development over geologic time and therefore the spatial distribution of reservoir-, seal- and source rocks.

We claim:

1. A method for stratigraphic analysis of seismic data, comprising:
   (a) selecting a seismic data volume comprising a plurality of samples;
   (b) selecting a number of horizons within the seismic data volume;
   (c) selecting a scale of interest within the seismic data volume, which ranges from at least 500 meters up to the size of the entire seismic data volume;
   (d) applying an attribute function to at least one of the selected number of horizons at the selected scale of interest; and
   (e) displaying a stratigraphic attribute which represents a geologic feature as a result of applying the attribute function at the selected scale.

2. The method of claim 1, wherein:
   the seismic data volume spans at least a substantial part of a hydrocarbon containing formation and the method is used for managing exploration and/or production of hydrocarbons from the formation;
   the selected scale is a substantially horizontal scale which ranges from at least 500 m up to the horizontal size of the entire seismic data volume;
   the stratigraphic attribute, which represents a geologic feature, is displayed with a contrasting color and is a seismic facies attribute, or a thinning or unconformity attribute that highlights a rate of thickness change of a formation layer located between a pair of selected adjacent horizons.

3. The method of claim 2, wherein the stratigraphic attribute is a thinning attribute and the step of applying the attribute function comprises:
   (a) selecting a point of interest (S) within the seismic data volume;
   (b) selecting a first horizon (TH) and a second horizon (BH), respectively above and below the point of interest (S);
   (c) selecting a direction (A);
   (d) determine a first pair of end points ($T_1, B_1$) situated on the first and second horizons (TH, BH) at a distance (0.5D) of half the user-defined scale (D), in the set direction (A); then determine second pair of end points ($T_2, B_2$) situated on the first and second horizons (TH, BH) at a distance (0.5D) of half the user-defined scale, in a direction opposite to the set direction (A);
   (e) deriving a first thickness property ($Z_1$) at the first pair of end points ($T_1, B_1$);
   (f) deriving a second thickness property ($Z_2$) at the second pair of end points ($T_2, B_2$);
   (g) calculating a rate ($Z_1/Z_2$) between the first thickness property ($Z_1$) and the second thickness property ($Z_2$);
   (h) assigning the rate ($Z_1/Z_2$) to be the thinning attribute at the point of interest (S);

(i) repeating steps (a)-(h) for a plurality of points of interest (S) within the seismic data volume.

4. The method of claim 3, wherein the thickness rate (R) is obtained by regression analysis of thicknesses as a function of distance.

5. The method of claim 3, wherein the rate is a logarithmic rate $\log(Z_1)-\log(Z_2)$ or $\log(R)$.

6. The method of claim 2, wherein the stratigraphic attribute is an unconformity attribute and the step of applying the attribute function comprises:
(a) selecting a point of interest (SP) within the seismic data volume;
(b) selecting a first horizon (TPH) and a second horizon (BPH), respectively, above and below the point of interest (SP);
(c) within a radius (0.5D) of half the user-defined scale from the point of interest (S), determine points ($TP_1$, $BP_1$) situated on the first and second horizons (TPH, BPH), which exhibit the maximum thickness property ($Z_{max}$);
(d) deriving a seed thickness property (Z) between the first and second horizons (TPH, BPH) at the point of interest (S);
(e) calculating a rate ($Z_{max}/Z$) between the seed thickness property (Z) and the maximum thickness property ($Z_{max}$);
(f) assigning the rate ($Z_{max}/Z$) to be a unconformity attribute at the location of the point of interest (S);
(g) repeating steps (a)-(f) for a plurality of points of interest (SP) within the seismic data volume.

7. The method of claim 2, wherein the stratigraphic attribute is a seismic-facies attribute and the step of applying the attribute function comprises:
(a) selecting a seismic-facies attribute data volume comprising a plurality of samples;
(b) selecting a point of interest (SM) within the seismic data volume;
(c) selecting point (SM) to be a seed point;
(d) selecting or generating a horizon (SMH) containing the seed point (SM);
(e) extracting all points (XM) situated on horizon (SMH) within a distance (0.5D) of half the user-defined scale (D);
(f) estimating or extracting the set of seismic-facies attribute values (FM) associated to points (XM);
(g) calculating the statistical mean or average of the set of seismic-facies attribute values (FP)
(h) assigning the statistical mean to be the final seismic-facies attribute at the point of interest (SM);
(i) repeating steps (a)-(h) for a plurality of points of interest (SM) within the seismic data volume.

8. The method of claim 7, wherein the seismic-facies attribute is the difference between the seismic dip angle estimated at a small scale and the seismic dip angle estimated at a larger scale.

9. The method of claim 8, wherein the difference is a monotonically increasing function of the angular difference or the absolute value of the angular difference.

10. The method of claim 7, wherein the seismic-facies attribute is one eigenvalue of the structure tensor, which is a regularized form of the matrix V times V transpose, where V represents the seismic dip vector field, the seismic normal vector field or some variant of seismic structure information.

11. The method of claim 10, wherein the seismic facies attribute is a significant combination or function of the structural tensor eigenvalues.

12. The method of claim 7, wherein the seismic-facies attribute comprises any selected seismic attribute of interest, such as local dip, local relative dip, instantaneous frequency, instantaneous phase or cosine phase.

13. The method of claim 7, wherein the statistical mean includes any other statistical measure of a collection of samples, such as a median value, a standard deviation, or a variance.

14. The method of claim 1, wherein the method is applied to a crooked two-dimensional (2D) seismic line or section, or to a plurality of 2D seismic lines or sections, or to a three-dimensional (3D) seismic volume.

15. The method of claim 1, wherein a plurality of horizons is generated beforehand, and on-demand horizons are interpolated from the plurality of horizons for the purposes of the applying the steps of the method of claim 1.

* * * * *